US012784169B2

(12) United States Patent
Li et al.

(10) Patent No.: US 12,784,169 B2
(45) Date of Patent: Nov. 3, 2026

(54) NUMERICAL SIMULATION METHOD AND SYSTEM FOR EFFECT OF CLAY MINERALS ON BRITTLENESS IN CONTINENTAL SHALE

(71) Applicant: Northeast Petroleum University, Daqing (CN)

(72) Inventors: Xin Li, Daqing (CN); Xiaofei Fu, Daqing (CN); Bo Liu, Daqing (CN); Jinyou Zhang, Daqing (CN); Yanfang Lyu, Daqing (CN); Haixue Wang, Daqing (CN); Jun Feng, Daqing (CN); Xiaobo Liu, Daqing (CN); Yuqi Zhang, Daqing (CN)

(73) Assignee: Northeast Petroleum University, Daqing (CN)

( * ) Notice: Subject to any disclaimer, the term of this patent is extended or adjusted under 35 U.S.C. 154(b) by 0 days.

(21) Appl. No.: 19/373,117

(22) Filed: Oct. 29, 2025

(65) Prior Publication Data

US 2026/0245190 A1 Aug. 20, 2026

(51) Int. Cl.
*G06T 19/00* (2011.01)
*G06T 5/20* (2006.01)
(Continued)

(52) U.S. Cl.
CPC .............. *G06T 7/0002* (2013.01); *G06T 5/20* (2013.01); *G06T 7/11* (2017.01); *G06T 7/136* (2017.01);
(Continued)

(58) Field of Classification Search
CPC . G06T 7/0002; G06T 5/20; G06T 7/11; G06T 7/136; G06T 19/00;
(Continued)

(56) References Cited

U.S. PATENT DOCUMENTS

2017/0016873 A1* 1/2017 Ly ...................... G01N 23/2251
2019/0087939 A1* 3/2019 Hakimuddin ........... G06F 18/24
(Continued)

*Primary Examiner* — Andrew W Bee
*Assistant Examiner* — Devin J Dhooge
(74) *Attorney, Agent, or Firm* — Nitin Kaushik

(57) ABSTRACT

The present disclosure discloses a numerical simulation method and system suitable for the effect of clay minerals on brittleness in continental shale, which belongs to the technical field of rock mechanical properties research. In the process of digital core stress simulation, the method of adjusting the number of pixels, coordinates, mechanical properties, and boundary conditions is used to simulate the content and distribution of geological components, the types of clay minerals and the changes caused by deep burial in the evolution process of clay minerals, and then determine the influence coefficient of each factor on brittleness. The present disclosure can make up for the defect that the single factor of natural samples is uncontrollable, and the three-dimensional digital core model is adjusted by the double verification method, which improves the authenticity and reliability of the simulation results. At the same time, the influence coefficient of each factor on brittleness in the present disclosure integrates the correlation and importance of each factor on brittleness, and reduces the deviation caused by a single index.

4 Claims, 3 Drawing Sheets

(51) Int. Cl.
*G06T 7/00* (2017.01)
*G06T 7/11* (2017.01)
*G06T 7/136* (2017.01)

(52) U.S. Cl.
CPC .... *G06T 19/00* (2013.01); *G06T 2207/10081* (2013.01); *G06T 2207/20032* (2013.01); *G06T 2207/30181* (2013.01)

(58) Field of Classification Search
CPC . G06T 2207/10081; G06T 2207/20032; G06T 2207/30181
See application file for complete search history.

(56) References Cited

U.S. PATENT DOCUMENTS

| | | | | |
|---|---|---|---|---|
| 2020/0387759 | A1* | 12/2020 | Tian | G01N 33/24 |
| 2021/0063325 | A1* | 3/2021 | Drenzek | G01N 23/046 |
| 2024/0118213 | A1* | 4/2024 | Albassam | G06T 7/0002 |

* cited by examiner

NUMERICAL SIMULATION METHOD AND SYSTEM FOR EFFECT OF CLAY MINERALS ON BRITTLENESS IN CONTINENTAL SHALE

TECHNICAL FIELD

The present disclosure relates to the technical field of rock mechanical properties research, and more specifically relates to a numerical simulation method and system for the effect of clay minerals on brittleness in continental shale.

BACKGROUND

Shale oil in China is primarily found within continental sedimentary basins, representing a critical resource for significantly expanding the nation's oil and gas reserves and production. It is widely distributed across multiple basins, including the Songliao, Bohai Bay, Northern Jiangsu, Jianghan, Sichuan, Ordos, Junggar, Santanghu, and Qaidam. Taking the Upper Cretaceous Qingshankou Formation in the Songliao Basin (Gulong shale oil) as an example, the estimated resource volume reaches 18.161 billion tons, demonstrating considerable potential. However, China's continental shale exhibits distinct characteristics in terms of reservoir properties, hydrocarbon retention, flow behavior, and compressibility. There is no precedent for large-scale commercial development worldwide, and the constructed geological theories and engineering technologies for marine shale are not directly applicable.

In terms of compressibility, brittleness is essential for achieving high production rates through hydraulic fracturing. Highly brittle rocks tend to form complex fracture networks after stimulation, thereby enhancing reservoir connectivity and increasing productivity. In contrast, low-brittleness rocks typically only develop simple planar fractures. Exploration practices in North America have also shown that commercially productive shale oil zones generally exhibit high brittleness, with clay mineral content usually below 30%. This indicates a strong correlation between clay mineral content and shale brittleness, which subsequently influences post-fracturing productivity.

However, the clay mineral content in China's continental shales generally exceeds the risk threshold considered suitable for shale fracturing in North America. Whether such rocks can achieve high production after fracturing remains uncertain. Addressing this challenge hinges on a key insight: while it is widely accepted that biogenic quartz in marine shales enhances brittleness, the role of clay mineral evolution in continental shales and its potential to improve brittleness remain controversial. The evolution of clay minerals involves transformations in mineralogy, precipitation of quartz, development of porosity, and increased confining pressure. The extent to which these factors influence shale brittleness, which dominate, and how they affect fracturing performance are still not well understood, with no constructed best practices available.

Therefore, there is an urgent need to develop a numerical simulation method and system specifically designed to evaluate the impact of clay minerals on the brittleness of continental shale. Investigating the mechanism by which the development and evolution of clay minerals influence shale brittleness is a key engineering problem that requires immediate resolution.

SUMMARY

In view of this, the present disclosure provides a numerical simulation method and system for the effect of clay minerals on brittleness in continental shale. Through digital core stress simulation, it makes up for the uncontrollable defects of single factor of natural samples, adjusts the relevant variables in the evolution process of clay minerals, simulates the mechanical properties and fracture effect of shale, and analyzes the single control factor of brittleness.

In order to achieve the above purpose, the present disclosure adopts the following technical scheme:

On the one hand, the present disclosure discloses a numerical simulation method for the effect of clay minerals on brittleness in continental shale, including the following steps:

performing a pixel processing of a CT image of a drilling core sample in a shale oil exploration area, and constructing a three-dimensional digital core model;

based on a pixel content of different media in the CT image, performing a first adjustment for the three-dimensional digital core model; based on stress-strain characteristics of rock mechanics obtained from rock mechanics experiments, performing a second adjustment for the three-dimensional digital core model;

according to an adjustment process of the first adjustment and the second adjustment, determining a digital core characterization unit;

performing a single factor simulation in the digital core characterization unit, the single factor includes geological component content, geological component distribution, clay mineral type, and accompanying deep burial; and based on the analysis of single factor simulation results, calculating an influence coefficient of each factor on brittleness, and determining a degree of influence of each factor on brittleness according to the coefficient.

In some embodiments, performing a pixel processing of the CT image of the drilling core sample in the shale oil exploration area, and constructing a three-dimensional digital core model, including:

S11, performing a gray value optimization processing, threshold region segmentation processing, and median filtering processing on the CT image in turn to obtain an image to be processed;

S12, distinguishing the pixels of different media on the image to be processed, and extracting pixel coordinates of each medium; and S13, according to the medium corresponding to each pixel point, assigning initial mechanical parameters to the pixel points to construct a three-dimensional digital core model.

In some embodiments, performing the first adjustment for the three-dimensional digital core model, comprising:

Querying a pixel content of different media in the three-dimensional digital core model and comparing it with the pixel content of different media in the CT image; according to the comparison result of pixel content, judging whether the model pixel of the three-dimensional digital core model is reliable; if the judgment result is that the model pixel is not reliable, repeating S11-S13 until the judgment result is that the model pixel is reliable.

In some embodiments, performing the second adjustment for the three-dimensional digital core model, including:

performing a stress simulation of the three-dimensional digital core model, and outputting the digital simulation stress-strain characteristics;

performing a rock mechanics test on the drilling core samples in the shale oil exploration area to obtain the stress-strain characteristics of rock mechanics, and obtaining the rock mechanics attribute parameters;

by comparing the digital simulation stress-strain characteristics and the rock mechanics stress-strain characteristics, judging a reliability of the model characteristics of the three-dimensional digital core model according to a comparison result of the stress-strain characteristics; if the judgment result is that the model characteristics are unreliable, adjusting the initial mechanical parameters in S13 by using the rock mechanics property parameters until the judgment result is that the model characteristics are reliable.

In some embodiments, the determination process of the digital core characterization unit is as follows:

according to the judgment process of model pixel reliability and model feature reliability of the three-dimensional digital core model, counting the correlation between a side length/pixel of the digital core and the mechanical parameters; and selecting a minimum digital core side length/pixel when the mechanical parameters are stable as the side length/pixel of the characterization unit, and then constructing the digital core characterization unit according to the relationship between the CT image pixel and the real length.

In some embodiments, performing a single factor simulation in the digital core characterization unit, including:

by adjusting the number of pixels in different media, simulating a change of geological component content;

by adjusting the pixel coordinates of different media, simulating a distribution of geological components;

by adjusting the initial mechanical parameters of different types of clay mineral pixels, simulating a change of clay mineral type; and by adjusting the boundary conditions, simulating a change of buried depth.

In some embodiments, the influence coefficient $K_i$ of the i-th factor on brittleness is determined based on the correlation coefficient $a_{i1}$ of the i-th factor and the weight $a_{i2}$ of the i-th factor, the formula is as follows:

$$K_i = a_{i1} \times a_{i2};$$

where the correlation coefficient $a_{i1}$ of the i-th factor is obtained based on the single factor analysis; the weight $a_{i2}$ of the i-th factor is obtained based on the AHP analytic hierarchy process.

The influence coefficient of each factor is standardized, and the factors are sorted from high to low according to the standardized results, the influence degree of various factors on brittleness is determined.

On the other hand, the present disclosure also discloses a numerical simulation system for the effect of clay minerals on brittleness in continental shale, including:

a model construction module, configured to perform a pixel processing on the CT image of drilling core samples in the shale oil exploration area, and establish a three-dimensional digital core model;

a model adjustment module, configured to perform the first adjustment for the three-dimensional digital core model based on the pixel content of different media in the CT image; based on the stress-strain characteristics of rock mechanics obtained from rock mechanics experiments, the second adjustment of the three-dimensional digital core model is performed;

a characterization unit determination module, configured to determine the digital core characterization unit according to the adjustment process of the first adjustment and the second adjustment;

a single factor simulation module, configured to perform a single factor simulation in the digital core characterization unit, the single factor includes geological component content, geological component distribution, clay mineral type, and accompanying deep burial; and an influence degree analysis module, configured to analyze the results of single factor simulation, calculate the influence coefficient of each factor on brittleness, and determine the degree of influence of each factor on brittleness according to the coefficient.

According to the above technical scheme, the present disclosure provides a numerical simulation method and system for effect of clay minerals on brittleness in continental shale, in the simulation process, the method of adjusting the number of pixels, coordinates, mechanical properties and boundary conditions is used to simulate the content and distribution of geological components (clay minerals, pores, felsic minerals (mainly quartz)), the type of clay minerals and the change of mechanical properties and fracture effect caused by deep burial (confining pressure) in the evolution process of clay minerals, and then determine the influence coefficient of single factor on brittleness. The present disclosure has the following beneficial effects:

1, through digital core stress simulation, the defects of uncontrollable single factors and the high cost of natural samples in physical experiments are made up.

2, the dual verification method of shale mineral/pore and rock mechanical properties is used to adjust the three-dimensional digital core model, which improves the authenticity and reliability of the simulation results.

3, the influence coefficient of the present disclosure integrates the correlation and importance of the influence of various factors on brittleness, which not only reflects the direct relationship between factors and brittleness, but also considers the relative importance of this relationship in practical application, reduces the deviation caused by a single index, and makes the final influence degree more convincing.

BRIEF DESCRIPTION OF THE DRAWINGS

In order to more clearly explain the technical scheme in the embodiment or the existing technology of the present disclosure, the following will briefly introduce the drawings that need to be used in the embodiment or the existing technology description. Obviously, the drawings in the following description are only the embodiment of the present disclosure, for ordinary technicians in this field, other drawings can be obtained according to the provided drawings without paying creative labor.

DETAILED DESCRIPTION OF THE EMBODIMENTS

The following description, in conjunction with the drawings of the embodiments of the present disclosure, sets forth clearly and completely the technical solutions of the embodiments. It is evident that the described embodiments represent only a portion of the embodiments of the present disclosure, rather than all of them. All other embodiments obtained by those of ordinary skill in the art based on the embodiments herein without creative effort shall fall within the scope of protection of the present disclosure.

Figure 1:
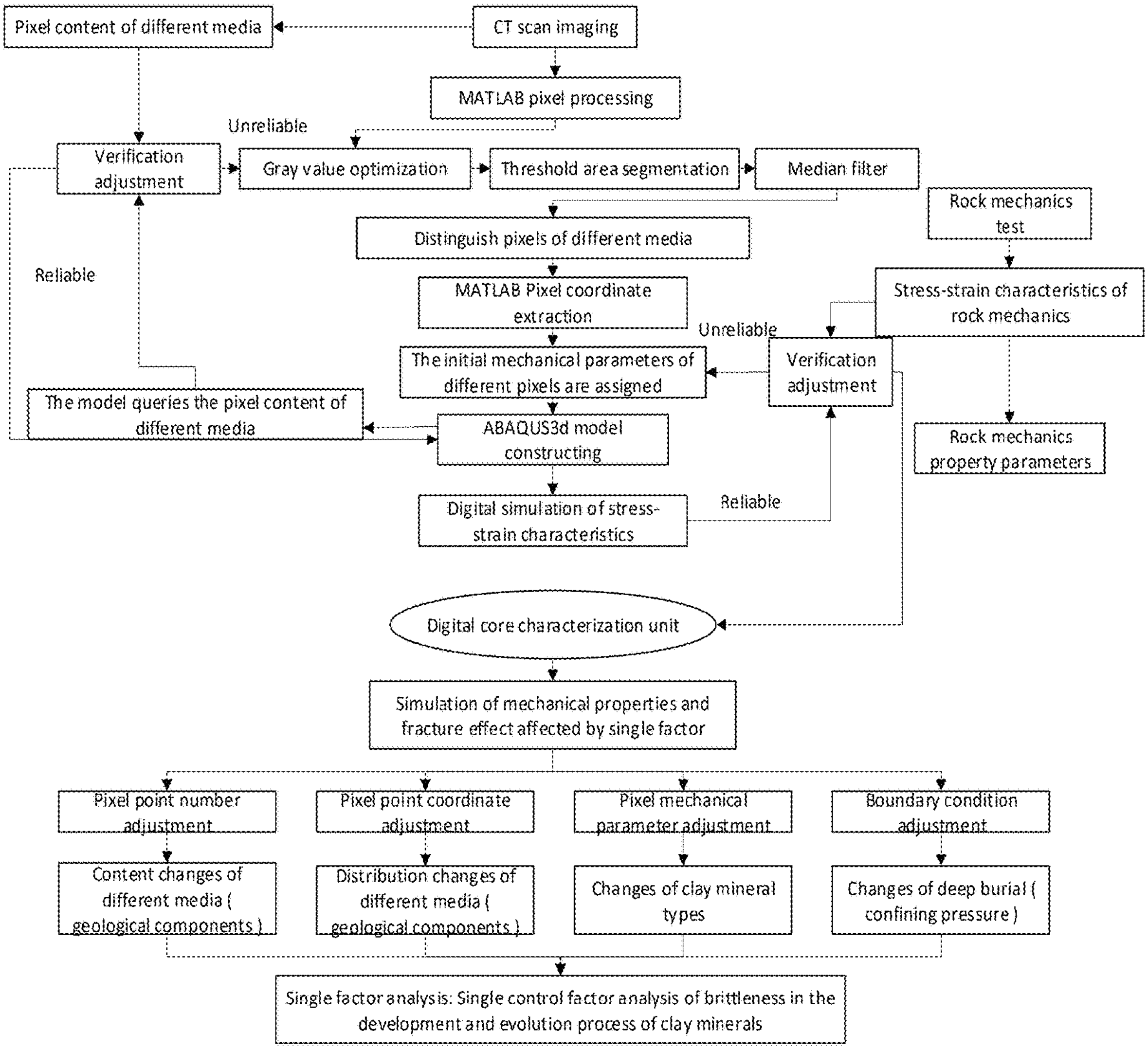
FIG. 1 is a stress simulation flow chart based on the three-dimensional digital core model provided by the present disclosure.
Figure 2:
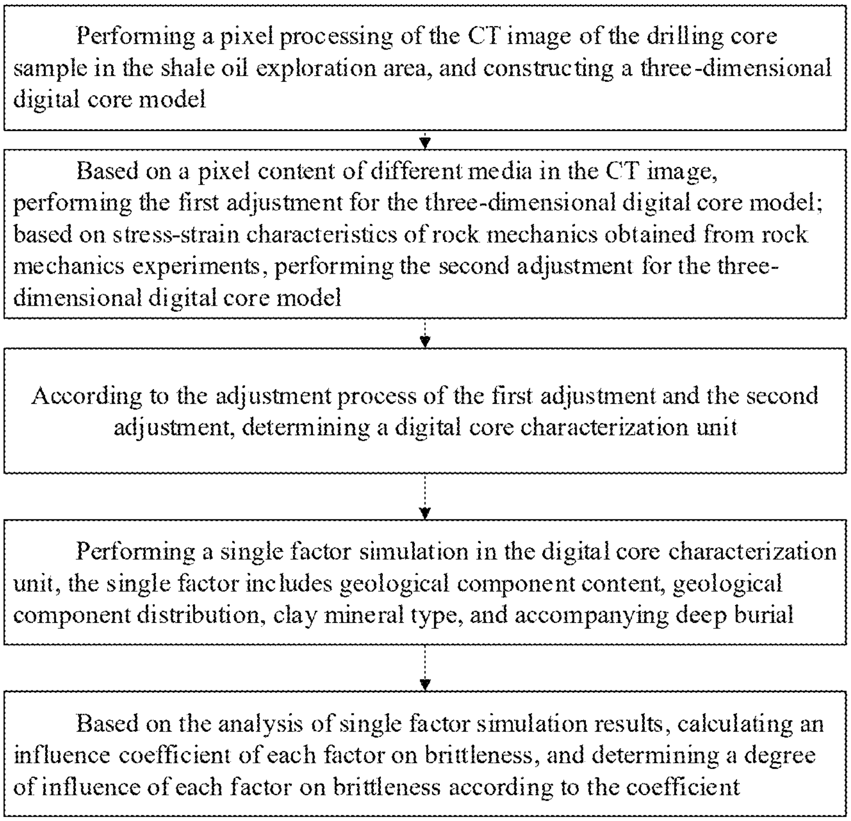
FIG. 2 is an overall flow chart of the method provided by the present disclosure.

On the one hand, the embodiment of the present disclosure discloses a numerical simulation method for the effect of clay minerals on brittleness in continental shale. Referring to FIGS. 1-2, the method includes the following steps:

S1, pixel processing of CT images of drilling core samples in the shale oil exploration area is performed, and a three-dimensional digital core model is constructed, this step is based on MATLAB, including:

S11, the gray value optimization processing, threshold region segmentation processing, and median filtering processing on the CT image are performed in turn to obtain an image to be processed;

S12, the pixels of different media (i.e., geological components, including clay minerals, pores, felsic minerals (mainly quartz), etc.) on the image to be processed are distinguished, and the pixel coordinates of each medium are extracted; and S13, according to the medium corresponding to each pixel point, the initial mechanical parameters are assigned to the pixel points to construct a three-dimensional digital core model.

S2, based on the pixel content of different media in the CT image, the first adjustment is performed for the three-dimensional digital core model; based on stress-strain characteristics of rock mechanics obtained from rock mechanics experiments, the second adjustment is performed for the three-dimensional digital core model;

Among them, the first adjustment is performed for the three-dimensional digital core model, including:

the pixel content of different media in the three-dimensional digital core model is queried, and the pixel content of different media in the CT image is compared; according to the pixel content comparison result, the model pixel point of the three-dimensional digital core model is judged to be reliable, if the judgment result is that the model pixel point is not reliable, S11-S13 are repeated until the judgment result is that the model pixel point is reliable.

The standard for the reliability of the model pixels is that the ratio of the pixel content of a medium in the three-dimensional digital core model to the pixel content of the medium in the CT image is not less than the preset threshold, and the model pixels are determined to be reliable, otherwise, the model pixels are determined to be unreliable, S11-S13 are repeated.

The second adjustment is performed for the three-dimensional digital core model, including:

the stress simulation of the three-dimensional digital core model is performed, and the digital simulation stress-strain characteristics are output;

the rock mechanics test of drilling core samples in the shale oil exploration area is performed to obtain the stress-strain characteristics of rock mechanics and the parameters of rock mechanics properties;

the digital simulation stress-strain characteristics and rock mechanics stress-strain characteristics are compared, according to the comparison results of stress-strain characteristics, the reliability of the model characteristics of the three-dimensional digital core model is judged, if the judgment result is that the model characteristics are unreliable, the initial mechanical parameters in S13 are adjusted by using the rock mechanics attribute parameters until the judgment result is that the model characteristics are reliable.

In this embodiment, when the digital simulation stress-strain characteristics are highly consistent with the results of rock mechanics tests in curve shape, characteristic values (such as peak stress, peak strain, elastic modulus, yield strength, etc.) and failure modes (such as splitting, shear, compression, etc.), it can be considered that the model characteristics of the three-dimensional digital core model are reliable.

The errors in the comparison results are quantitatively analyzed to ensure that the errors are within the acceptable range.

If the judgment result is that the model characteristics are unreliable, the initial mechanical parameters in the three-dimensional digital core model need to be adjusted according to the rock mechanical property parameters (such as elastic modulus, Poisson's ratio, tensile strength, compressive strength, etc.). After adjustment, the numerical simulation is performed again and compared with the results of the rock mechanics test until the reliability standard is met.

S3, digital core characterization unit is determined according to the adjustment process of the first adjustment and the second adjustment.

S31, the judgment process of model pixel reliability and model feature reliability based on a 3D digital core model.

The correlation between the side length/pixel of the digital core and the mechanical parameters is statistically analyzed;

by adjusting the resolution of the digital core model (that is, changing the ratio of side length/pixel), multiple models with different resolutions are generated;

the stress simulation of each model with different resolutions is performed, and the corresponding mechanical parameters are recorded and extracted;

the trend of mechanical parameters changing with the side length/pixel of the digital core is observed.

S32, the minimum digital core side length/pixel when the mechanical parameters are stable is selected as the side length/pixel of the characterization unit, and then the digital core characterization unit is constructed according to the relationship between the CT image pixel and the real length.

According to the change trend in S31, when the mechanical parameters tend to be stable after a certain side length/pixel value (that is, the change range is within an acceptable range), it is considered that the value is the minimum digital core side length/pixel when the mechanical parameters are stable, that is, the side length/pixel of the characterization unit.

Using the known CT image resolution (the true length of each pixel), the selected side length/pixel of the characterization unit is converted to the true length.

Taking the selected real length as the side length, the characterization unit is constructed. This unit will be used for subsequent rock mechanics analysis and simulation to represent the mechanical behavior of the entire core.

S4, single factor simulation is performed in the digital core characterization unit, and the single factor includes geological component content, geological component distribution, clay mineral type, and accompanying deep burial.

Specifically, by adjusting the number of pixels in different media, the change of geological component content is simulated;

by adjusting the pixel coordinates of different media, the distribution of geological components is simulated;

by adjusting the initial mechanical parameters of different types of clay mineral pixels, the change of clay mineral type is simulated;

by adjusting the boundary conditions (pressure, temperature, etc.), the change of buried depth is simulated;

S5. Based on the analysis of single factor simulation results, the influence coefficient of each factor on brittleness is calculated, and the degree of influence of each factor on brittleness is determined according to the coefficient.

S51. The influence coefficient $K_i$ of the i-th factor on brittleness is determined based on the correlation coefficient $a_{i1}$ of the i-th factor and the weight $a_{i2}$ of the i-th factor. The formula is as follows:

$$K_i = a_{i1} \times a_{i2};$$

where the correlation coefficient $a_{i1}$ of the i-th factor is based on single factor analysis; the weight $a_{i2}$ of the i-th factor is based on the AHP analytic hierarchy process.

In this embodiment, the brittleness index is calculated by combining elastic parameters, fracture toughness, and stress-strain curves, the relevant parameters in the calculation process are obtained based on digital core stress simulation.

The specific calculation formula of the brittleness index B is as follows:

$$B = w_1 * B_i + w_2 * K_c + w_3 * B_m$$

where $B_i$ denotes the brittleness index based on elastic parameters; $K_c$ denotes the brittleness index of fracture toughness; $B_m$ is the brittleness index based on the stress-strain curve, where:

$$B_i = 50\left(\frac{E - E_{min}}{E_{max} - E_{min}} + \frac{v - v_{min}}{v_{max} - v_{min}}\right)$$

E is Young's modulus, vis Poisson's ratio, $E_{max}$ is the maximum Young's modulus of rock, and $E_{min}$ is the minimum Young's modulus, $v_{max}$ is the maximum Poisson's ratio of rock, and $v_{min}$ is the minimum Poisson's ratio of rock.

In the process of shale gas fracturing, I-fractures and II-fractures are usually produced. The toughness of the I-fractures and II-fractures is normalized to obtain the fracture toughness index $K_c$:

$$K_c = 50\left(\frac{K_{Imax} - K_I}{K_{Imax} - K_{Imin}} + \frac{K_{IImax} - K_{II}}{K_{IImax} - K_{IImin}}\right)$$

$K_{Imax}$ and $K_{Imin}$ are the maximum and minimum values of fracture toughness of I-fracture, respectively, $K_{IImax}$ and $K_{IImin}$ are the maximum and minimum values of fracture toughness of II-fracture, respectively.

$$B_m = B_{i1} + B_{i2}$$

-continued $$B_{i1} = \frac{(\delta_p - \delta_i)/\delta_p}{(\varepsilon_p - \varepsilon_i)/\varepsilon_p}$$

$$B_{i2} = \frac{(\delta_p - \delta_r)/\delta_p}{(\varepsilon_r - \varepsilon_p)/\varepsilon_p}$$

$B_{i1}$ and $B_{i2}$ are two brittleness indices determined by the triaxial stress-strain curve. $B_{i1}$ is the brittleness index characterized by the stress-strain curve parameters of the front section, and $B_{i2}$ is the brittleness index characterized by the stress-strain curve parameters of the back section. $\delta_i$ and $\delta_p$ are the initiation stress and peak stress, respectively. $\varepsilon_i$ and $\varepsilon_p$ are the initiation strain and peak strain, respectively; $\delta_r$ is the residual stress; $\varepsilon_r$ is the residual strain.

$w_1$, $w_2$, and $w_3$ are the weight parameters of $B_i$, $K_c$, and $B_m$, respectively. According to the AHP analytic hierarchy process, the three parameters ($B_i$, $K_c$ and $B_m$) are quantified and compared by the analytic hierarchy process. The relative importance of each factor ($B_i$, $K_c$, and $B_m$) in each level is determined by giving the corresponding scale, and the judgment matrix is constructed. By solving the maximum eigenvalue of the judgment matrix and the corresponding orthogonal eigenvector, the weight parameters $w_1$, $w_2$, and $w_3$ of each element in this level are obtained.

The principle of using the AHP analytic hierarchy process to obtain the weight $a_{i2}$ of the i-th factor is the same as the process of determining $w_1$, $w_2$, and $w_3$.

In the single factor analysis of each factor, the analysis factors are first determined to ensure that other factors are constant. A series of test levels (different values or conditions) is set for the analysis factors within the set range, and the levels of the analysis factors are changed one by one. The brittleness index values at each test level are measured and recorded.

Statistical methods (such as Pearson correlation coefficient, Spearman rank correlation coefficient, etc.) are used to calculate the correlation coefficient an between the analysis factor and the brittleness index. These correlation coefficients provide a quantitative indicator of the strength of the linear relationship between the analysis factor and the brittleness index.

S52, the influence coefficient of each factor is standardized, and the degree of influence of each factor on brittleness is determined according to the standardization results from high to low.

The standardized formula is:

$$K_i' = \frac{K_i}{\sum_{i=1}^{n} |K_i|}$$

where $K'_i$ is a standard value of the influence coefficient of the i-th factor, and n is the number of influencing factors.

The standardized values of the influence coefficients of each factor are sorted from high to low; the influence of this factor on brittleness is greater when the standard value is larger.

Figure 3:
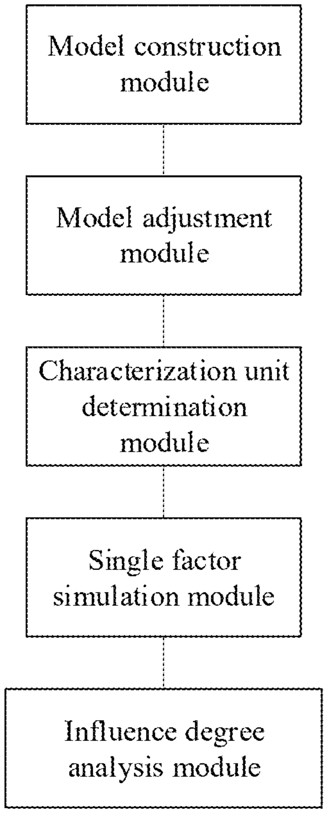
FIG. 3 is a system architecture diagram provided for the present disclosure.

On the other hand, the present disclosure also discloses a numerical simulation system for the effect of clay minerals on brittleness in continental shale, as shown in FIG. 3. The system includes:

a model construction module, configured to perform the pixel processing on the CT image of drilling core samples in the shale oil exploration area, and establish a three-dimensional digital core model;

a model adjustment module, configured to perform the first adjustment for the three-dimensional digital core model based on the pixel content of different media in the CT image; based on the stress-strain characteristics of rock mechanics obtained from rock mechanics experiments, the second adjustment of the three-dimensional digital core model is performed;

a characterization unit determination module, configured to determine the digital core characterization unit according to the adjustment process of the first adjustment and the second adjustment;

a single factor simulation module, configured to perform a single factor simulation in the digital core characterization unit, the single factor includes geological component content, geological component distribution, clay mineral type, and accompanying deep burial; and an influence degree analysis module, configured to analyze the results of single factor simulation, calculate the influence coefficient of each factor on brittleness, and determine the degree of influence of each factor on brittleness according to the coefficient.

The embodiments in this specification are described progressively, with each embodiment emphasizing its differences from the others. For parts that are similar or identical across embodiments, reference may be made to the corresponding descriptions in other sections. Regarding the embodiments related to devices, which correspond to the methods already disclosed, the description is relatively brief; relevant details can be found in the method section.

The above description of the disclosed embodiments enables those skilled in the art to implement or use the present disclosure. Various modifications to these embodiments will be readily apparent to those skilled in the art. The general principles defined herein may be applied to other embodiments without departing from the spirit or scope of the present disclosure. Accordingly, the present disclosure is not limited to the embodiments shown herein but is to be accorded the broadest scope consistent with the principles and novel features disclosed in this disclosure.

What is claimed is:

1. A method of numerically simulating an effect of clay minerals on brittleness in continental shale, comprising: performing a pixel processing on a CT image of a drilling core sample in a shale oil exploration area, and constructing a three-dimensional digital core model, comprising: step a, performing a gray value optimization processing, a threshold region segmentation processing, and a median filtering processing on the CT image in turn to obtain an image to be processed; step b, distinguishing pixels of different media on the image to be processed, and extracting pixel coordinates of each medium; and step c, according to a medium corresponding to each pixel point, assigning initial mechanical parameters to pixel points to construct the three-dimensional digital core model; based on a comparison result between a pixel content of different media in the three-dimensional digital core model and a pixel content of different media in the CT image, performing a first adjustment for the three-dimensional digital core model, comprising: querying the pixel content of different media in the three-dimensional digital core model and comparing the pixel content of different media in the three-dimensional digital core model with the pixel content of different media in the CT image; according to a comparison result of pixel content, judging whether a model pixel of the three-dimensional digital core model is reliable; and, if a judgment result is that the model pixel is not reliable, repeating steps a, b, and c until the judgment result is that the model pixel is reliable; and based on a comparison result between digital simulation stress-strain characteristics obtained from a stress simulation and stress-strain characteristics of rock mechanics obtained from a rock mechanics test, performing a second adjustment for the three-dimensional digital core model, comprising: performing the stress simulation on the three-dimensional digital core model, and outputting the digital simulation stress-strain characteristics; performing the rock mechanics test on the drilling core samples in the shale oil exploration area to obtain the stress-strain characteristics of rock mechanics, and obtaining rock mechanics attribute parameters; comparing the stress-strain characteristics of rock mechanics and the digital simulation stress-strain characteristics; judging a reliability of model characteristics of the three-dimensional digital core model according to a comparison result of stress-strain characteristics; and, if a judgment result is that the model characteristics are unreliable, adjusting the initial mechanical parameters in step c by using the rock mechanics attribute parameters until the judgment result is that the model characteristics are reliable; determining a digital core characterization unit according to the first adjustment and the second adjustment, comprising: according to a judgment process of reliability of model pixel of the three-dimensional digital core model and a judgment process of reliability of model characteristics of the three-dimensional digital core model, counting a correlation between a side length/pixel of a digital core and mechanical parameters; and selecting a minimum side length/pixel of the digital core when the mechanical parameters are stable as a side length/pixel of the digital core characterization unit, and then constructing the digital core characterization unit according to a relationship between a pixel of the CT image and a real length of the pixel; performing a single factor simulation in the digital core characterization unit, wherein a single factor in the single factor simulation comprises geological component content, geological component distribution, clay mineral type, and accompanying deep burial; and based on analysis of results of the single factor simulation, calculating an influence coefficient of each factor on brittleness, and determining a degree of influence of each factor on brittleness according to the influence coefficient.

2. The method of numerically simulating the effect of clay minerals on brittleness in continental shale according to claim 1, wherein performing the single factor simulation in the digital core characterization unit comprises:

by adjusting a number of pixels in different media, simulating a change of geological component content;

by adjusting pixel coordinates of different media, simulating a change of geological component distribution;

by adjusting initial mechanical parameters of pixels of different types of clay minerals, simulating a change of clay mineral type; and by adjusting boundary conditions, simulating a change of accompanying deep burial.

3. The method of numerically simulating the effect of clay minerals on brittleness in continental shale according to claim 1, wherein an influence coefficient $K_i$ of an i-th factor on brittleness is determined based on a correlation coefficient $a_{i1}$ of the i-th factor and a weight $a_{i2}$ of the i-th factor, a determination formula of the influence coefficient $K_i$ is as follows:

$$K_i = a_{i1} \times a_{i2};$$

wherein the correlation coefficient ail of the i-th factor is obtained based on the analysis of results of the single factor simulation, and the weight $a_{i2}$ of the i-th factor is obtained based on an analytic hierarchy process (AHP);

and wherein influence coefficients of factors are standardized, the influence coefficients of factors are sorted from high to low according to standardized results, and the degree of influence of each factor on brittleness is determined.

4. A system for numerically simulating an effect of clay minerals on brittleness in continental shale, comprising: a model construction module, configured to perform a pixel processing on a CT image of drilling core samples in a shale oil exploration area, and establish a three-dimensional digital core model, which comprises: step a, perform a gray value optimization processing, a threshold region segmentation processing, and a median filtering processing on the CT image in turn to obtain an image to be processed; step b, distinguish pixels of different media on the image to be processed, and extract pixel coordinates of each medium; and step c, according to a medium corresponding to each pixel point, assign initial mechanical parameters to pixel points to construct the three-dimensional digital core model; a model adjustment module, configured to perform a first adjustment for the three-dimensional digital core model based on a comparison result between a pixel content of different media in the three-dimensional digital core model and a pixel content of different media in the CT image, which comprises: query the pixel content of different media in the three-dimensional digital core model and compare the pixel content of different media in the three-dimensional digital core model with pixel content of different media in the CT image; according to a comparison result of pixel content, judge whether a model pixel of the three-dimensional digital core model is reliable; and, if a judgment result is that the model pixel is not reliable, repeat steps a, b and c until the judgment result is that the model pixel is reliable; and perform a second adjustment on the three-dimensional digital core model based on a comparison result between digital simulation stress-strain characteristics obtained from a stress simulation and stress-strain characteristics of rock mechanics obtained from a rock mechanics test, which comprises: perform the stress simulation on the three-dimensional digital core model, and output the digital simulation stress-strain characteristics; perform the rock mechanics test on the drilling core samples in the shale oil exploration area to obtain the stress-strain characteristics of rock mechanics, and obtain rock mechanics attribute parameters; compare the stress-strain characteristics of rock mechanics and the digital simulation stress-strain characteristics; judge a reliability of model characteristics of the three-dimensional digital core model according to a comparison result of stress-strain characteristics; and, if a judgment result is that the model characteristics are unreliable, adjust the initial mechanical parameters in step c by using the rock mechanics attribute parameters until the judgment result is that the model characteristics are reliable; a characterization unit determination module, configured to determine a digital core characterization unit according to the first adjustment and the second adjustment, which comprises: according to a judgment process of reliability of model pixel of the three-dimensional digital core model and a judgment process of reliability of model characteristics of the three-dimensional digital core model, count a correlation between a side length/pixel of a digital core and mechanical parameters; and select a minimum side length/pixel of the digital core when the mechanical parameters are stable as a side length/pixel of the digital core characterization unit, and then construct the digital core characterization unit according to a relationship between a pixel of the CT image and a real length of the pixel; a single factor simulation module, configured to perform a single factor simulation in the digital core characterization unit, wherein a single factor in the single factor simulation comprises geological component content, geological component distribution, clay mineral type, and accompanying deep burial; and an influence degree analysis module, configured to analyze results of the single factor simulation, calculate an influence coefficient of each factor on brittleness, and determine a degree of influence of each factor on brittleness according to the influence coefficient.

* * * * *